United States Patent [19]

Nakano et al.

[11] Patent Number: 4,799,183
[45] Date of Patent: Jan. 17, 1989

[54] VECTOR MULTIPLIER HAVING PARALLEL CARRY SAVE ADDER TREES

[75] Inventors: Hiraku Nakano; Hiroshi Murayama, both of Hadano, Japan

[73] Assignee: Hitachi Ltd., Tokyo, Japan

[21] Appl. No.: 920,600

[22] Filed: Oct. 20, 1986

[30] Foreign Application Priority Data

Oct. 24, 1985 [JP] Japan ............................. 60-237884

[51] Int. Cl.$^4$ .................................................. G06F 7/52
[52] U.S. Cl. ................................................. 364/760
[58] Field of Search ......................................... 364/760

[56] References Cited

U.S. PATENT DOCUMENTS

| | | | |
|---|---|---|---|
| 4,041,292 | 8/1977 | Kindell | 364/760 |
| 4,228,520 | 10/1980 | Letteney et al. | 364/760 |
| 4,525,796 | 6/1985 | Omoda et al. | 364/760 |
| 4,644,491 | 2/1987 | Ookawa et al. | 364/784 |

OTHER PUBLICATIONS

Waser et al., "Real-Time Processing Gains Ground with Fast Digital Multiplier" *Electronics*, Sep. 29, 1977, pp. 93–99.
Anderson et al., "The IBM System/360 Model 91: Floating-Point Execution Unit", IBM Journal, pp. 34–53, Jan. 1967.

*Primary Examiner*—David H. Malzahn
*Attorney, Agent, or Firm*—Saidman, Sterne, Kessler & Goldstein

[57] ABSTRACT

High and low order bit carry propagation adders are connected to outputs of carry save adder trees which produce half-sums and half-carries. Following carry propagation addition of the low order bits carry propagation addition of the high order bits is carried out. A carry from the low order bit carry propagation addition is added to the high order bit carry propagation addition.

5 Claims, 6 Drawing Sheets

VECTOR MULTIPLIER HAVING PARALLEL CARRY SAVE ADDER TREES

CROSS REFERENCE RELATING TO OTHER APPLICATION

The present invention relates to U.S. Pat. No. 4,644,491 entitled 'Sign Generation System for a Carry Save Adder' to T. Ookawa and H. Murayama, filed on Sept. 21, 1984, issued on Feb. 17, 1987 and assigned to the assignee of the present application.

BACKGROUND OF THE INVENTION

The present invention relates to multiplier and method for multiplication, and more particularly to multiplier and method for multiplication suitable for a vector processor which produces an operation result in each machine cycle.

A multiplier which overlap-scans multiplier's bits to generate a multiple of a multiplicand has been known by "The IBM System/360 Model 91: Floating-Point Execution Unit" by Anderson et al, IBM Journal, pages 34–53, January 1967. In this multiplier, a multiplier is divided and separate multiples of a multiplicand are generated one for each iteration. A half carry and a half sum are shifted right by the number of bits equal to the number of bits of the multiplier used to generate one multiple and they are then added to the next multiple, the half-carry and the half-sum which spill from a carry-save adder tree by the right shifting are summed by a low order bit adder, and when the multiplier for the multiple generation has been assimilated, the half-carries and the half-sums are summed by a carry propagation adder to produce a product. The two outputs of the carry-save adder are known in common as the carry and the sum. In the following description, the carry and the sum are called the half-carry and the half-sum, respectively.

In a recent vector processor called a super computer, it is frequently required that the multiplier can produce one product in each machine cycle. In the multiplier described in the above article or a similar multiplier in which multiplier's bits are divided and the divided multipliers' bits are supplied to the multiple generator in several cycles by iteratively using the common multiple generator to produce a final product, it is impossible to produce one product in each machine cycle.

In the U.S. patent application Ser. No. 653,053 which discloses a vector multiplier capable of producing one product in each machine cycle, a sign generation system of a carry-save adder (CSA) is mainly discussed and explanation of those portions which are not directly related to the sign generation of the carry-save adder is omitted. In FIG. 1, those portions which are related to the operation of the vector multiplier are shown and those portions which are not directly related to the operation of the vector multiplier are omitted.

In FIG. 1, numeral 1 denotes a multiplicand register and numerals 2 to 4 denote multiplicand delay registers which hold the content of the multiplicand register with predetermined time delays. Each of the registers has a 64-bit length. Numeral 5 denotes a multiplier register and numerals 6 to 8 denote multiplier delay registers which hold the content of the multiplier register with predetermined time delays. Those registers have 64-bit, 49-bit, 33-bit and 17-bit lengths, respectively. Numerals 9 to 12 denote CSA trees. Numerals 13 to 18 denote CSA's (carry-save adders), numerals 19, 21, 23 and 25 denote half-carry registers (HC), numerals 20, 22, 24 and 26 denote half-sum registers (HS), numerals 27 to 29 denote spill adders (SPA), numerals 30 to 33 denote spilled bit sum registers (SPAL), numeral 34 denotes a carry propagation adder (CPA) and numeral 35 denotes a carry propagation sum register (CPAL). FIG. 2 shows a detail of the CSA tree. Numerals 201 to 208 denote multiple generators, and numerals 209 to 214 denote carry-save adders. The operation of the CSA tree is described in the Anderson's article and the U.S. Ser. No. 653,053, and hence it is not explained here.

The operation of the vector multiplier shown in FIG. 1 is now explained with reference to a time chart of FIG. 3, in which Ai and Bi denote i-th multiplicand and multiplier, respectively.

First, A1 and B1 are set in a first machine cycle into the multiplicand register (MCAND-1) 1 and the multiplier register (MPLIR-1) 5, respectively. Then, the A1 (64 bits) is multiplied by the 48th to 63rd bits (16 bits) of the B1 by the CSA tree 9. The bits 48–50 of the multiplier, the bits 50–52, the bits 52–54 and so on, which are bit-overlapped to each other, are applied to second inputs of the multiple generators 201–208 of FIG. 2, and the multiplicand is applied to the first inputs. Each of the multiple generators generates a multiple and sends it to one of the CSA's 209–214 of FIG. 2, where they are carry-save added. The resulting half-carry and half-sum are set into the half-carry register (HC-1) 19 and the half-sum register (HS-1) 20, and the whole 64 bits of the A1 is set into the multiplicand delay register (MCAND-2) 2 and the high order 49 bits of the B1 are set into the multiplier delay register (MPLIR-2) 6. At the same time, the next vector elements A2 and B2 are set into the multiplicand register (MCAND-1) 1 and the multiplier register (MPLIR-1) 5, respectively, as shown in FIG. 3, and the same operation as that carried out for A1 and B1 in the previous machine cycle is carried out for A2 and B2.

Then, in the CSA tree 10, the 64 bits of the A1 is multiplied by the 32nd to 48th bits (17 bits) of the B1, the half-carry and the half-sum of CSA tree 10 are added to a partial products of the 64 bits of the A1 and the low order 16 bits of the B1 by the CSA's 13 and 14, they are set into the half-carry register (HC2) 21 and the half-sum register (HS2) 22, respectively and the low order 16 bits which were spilled in the shifting for summation are summed by the spill adder (SPA) 27 and the sum is set into the spilled bit sum register (SPAL-1) 30, at the same time, the 64 bits of the A1 is set into the multiplicand delay register (MCAND-3) 3 and the high order 33 bits of the B1 are set into the multiplier delay register (MPLIR-3) 7.

In the CSA tree 11, the A1 is multiplied by the 16th to 32nd bits (17 bits) of the B1 the half-carry and the half-sum of CSA tree 11 are added to a partial product of the 64 bits of the A1 and the low order 32 bits of the B1 by the CSA's 15 and 16 and they are set into the half-carry register (HC-3) 23 and the half-sum register (HS-3) 24, respectively, and the low order 16 bits which were spilled in the shifting for generating the sum are summed in the SPA 28 to which the latched carry from the SPA 27 is applied as a carry from the low order, although this is not shown in FIG. 1 in order to avoid the complexity. The output of the SPA 28 is combined with a data in the SPAL-1 30, which is sent into the SPAL-2 31. At the same time, the 64 bits of the A1 is set into the multiplicand delay register (MCAND-4) 4 and the high order 17 bits of the B1 and set into the multiplier delay register (MPLIR-4) 8.

In the CSA tree 12, the A1 is multiplied by the 0th to 16th bits (17 bits) of the B1, the half-carry and the half-sum of CSA tree 12 are added to a partial product of the 64 bits of the A1 and the low order 48 bits of the B1 by the CSA's 17 and 18 and they are set into the half-carry register (HC-4) 25 and the half-sum register (HS-4) 26, respectively, and the low order 16 bits which were spilled in the shifting for generating the sum are summed in the SPA 29 to which the latched carry from the SPA 28 is applied as a carry from the low order although this is not shown in FIG. 1 to avoid the complexity. The output of the SPA 29 is combined with a data in the SPAL-2 31, which is set into the SPAL-3 32.

The half carry of the HC-4 25 and the half-sum of the HS-4 26 are summed in the carry propagation adder (CPA) 34 to which the latched carry from the SPA 29 is applied as a carry from the low order, and the resulting sum is set into the CPAL 35, and the data in the SPAL-3 32 is transferred to the SPAL-4 33.

In this manner, the products of the 64×64 bits of the A1 and B1 is produced in the CPAL 35 and the SPAL-4 33.

However, in the vector multiplier which divides multiplier's bits and produces a product in each machine cycle by essentially serially connecting the CSA trees as shown in FIG. 1, the multiplicand and multiplier delay registers are required and the proportion of the delay registers in the multiplier is innegligiably large. Secondly a data travel time from the input of the multiplicand and the multiplier to the operand registers to the output of the product is long.

SUMMARY OF THE INVENTION

It is an object of the present invention to solve the above problems and reduce a cost.

It is another object of the present invention to provide a vector multiplier having a shortened data travel time from data input to operation result output.

It is other object of the present invention to shorten a machine cycle time including propagation of carries in multiplication.

It is other object of the present invention to reduce a scale of a vector multiplier by parallelly arranging CSA trees and eliminating multiplicand and multiplier delay registers.

In vector multipliers, the CSA trees are serially arranged instead of parallelly because a bit length of the final carry propagation addition is large, a time required for the carry propagation addition determines one machine cycle time and the reduction of the machine cycle time is difficult. The half-carries C1, C2, C3 and C4 and the half-sums S1, S2, S3 and S4 from the CSA trees of FIG. 1 are shifted as shown in FIG. 4. Because there are four stages of CSA trees in FIG. 2, the half-carry is shorter than the half-sum by 4 bits. Since a sign of the carry save adder is not directly related to the present invention, the most significant bit of each data in FIG. 4 is set to be equal to the most significant bit of the sum of the half-carry and the half-sum.

In FIG. 4, 28 bits of C1, 32 bits of S1, 12 bits of C2 and 16 bits of S2, that is, total of 88 bits surrounded by broken lines are applied to one LSI chip to carry out not only the carry save addition but also the succeeding carry propagation addition in one machine cycle. By dividing the 128-bit carry propagation adder into a 96-bit carry propagation adder and a 32-bit carry propagation adder, the bit length of the carry propagation addition at a time can be reduced.

In the present invention, the carry propagation addition is divided into two parts which are different in time, and a carry from the carry propagation adder which is advanced in time and other half-carries and half-sums which are not summed in the carry propagation adder which is advanced in time, are applied to the carry propagation adder which is retarded in time so that a final product is produced.

DESCRIPTION OF THE PREFERRED EMBODIMENTS

One embodiment of the present invention is now explained with reference to FIGS. 5 and 6.

Figure 2:
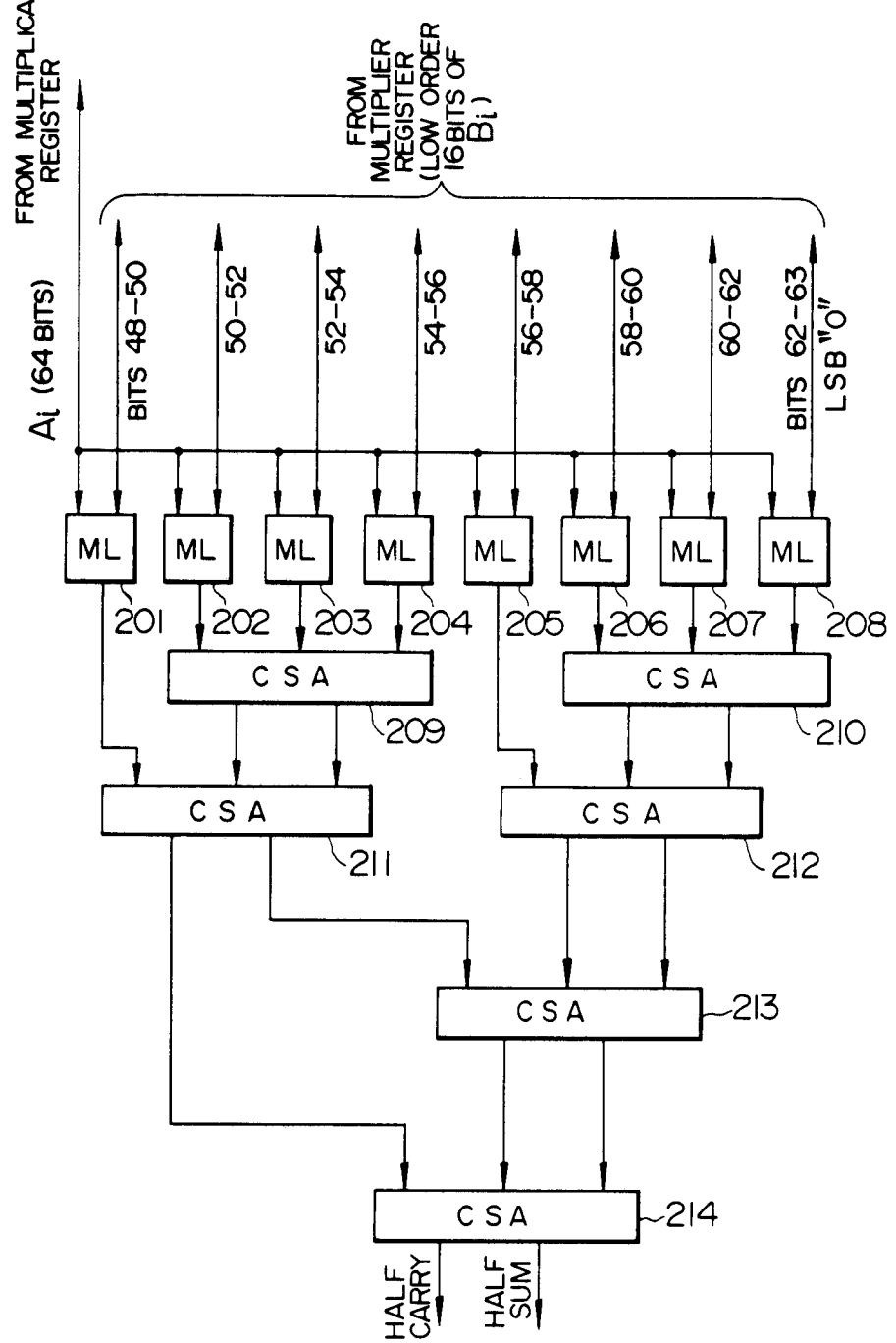
FIG. 2 shows a detail of a CSA tree.
Figure 5:
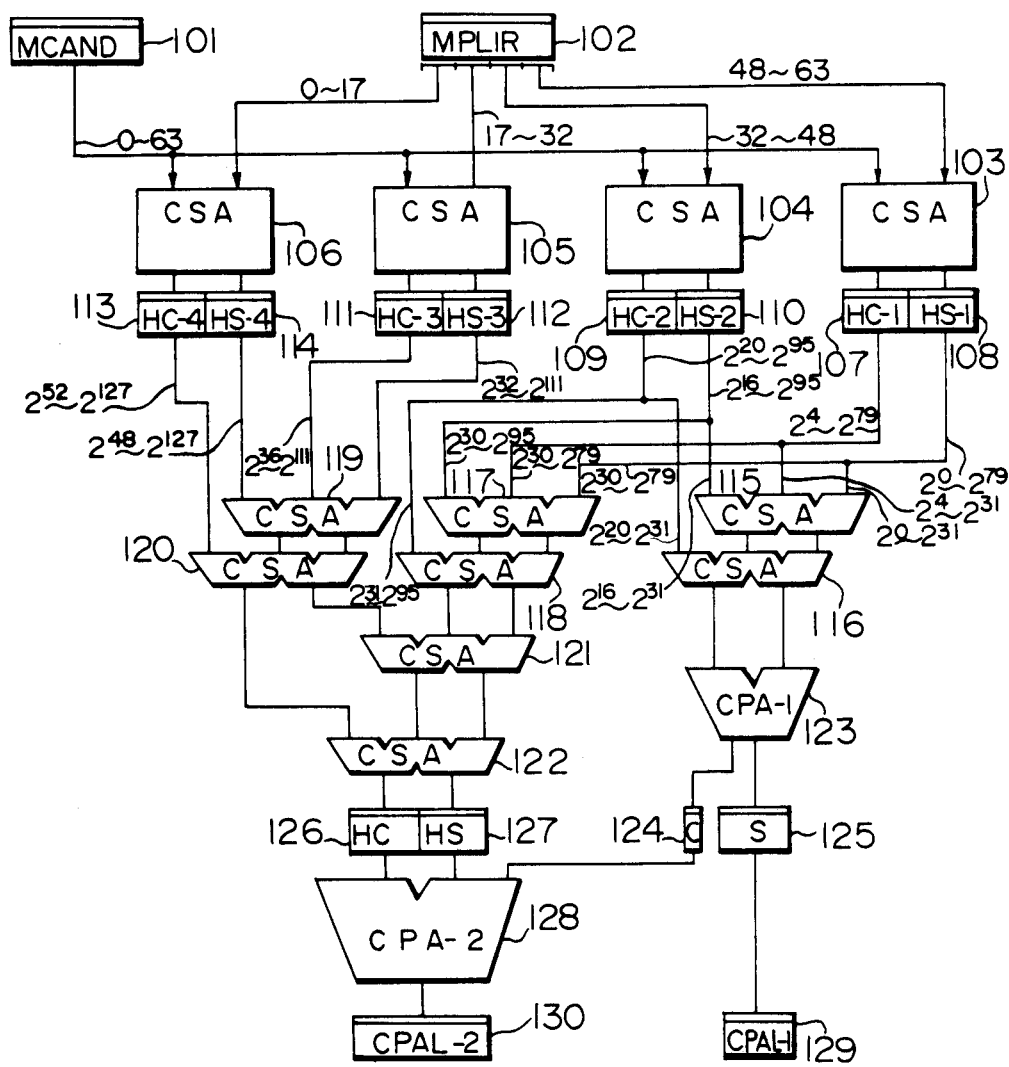
FIG. 5 is a block diagram of one embodiment of a vector multiplier of the present invention.

FIG. 5 shows an embodiment of the present invention. It shows a block diagram of a 64×64-bit vector multiplier. Numeral 101 denotes a multiplicand register (MCAND), numeral 102 denotes a multiplier register (MPLIR), numerals 103 to 106 denote CSA trees which are constructed as shown in FIG. 2, numerals 107 to 114 denote half-carry (HC) and half-sum (HS) register, numerals 115 to 122 denote carry save adders (CSA), numeral 123 denotes a low order bit carry propagation adder (CPA) of a carry save adder divided into two sections in accordance with the present invention, numerals 124 and 125 denote registers for latching a carry (C) and a 32-bit sum from the carry propagation adder 123, respectively, numerals 126 and 127 denote half-carry and half-sum registers, respectively, numeral 128 denotes a high order bit carry propagation adder of the carry propagation adder divided into two sections in accordance with the present invention, numeral 129 denotes a delay register for the low order sum received from the register 125, and numeral 130 denotes a register which latches the sum (96 bits) of the carry propagation adder 128.

Figure 3:
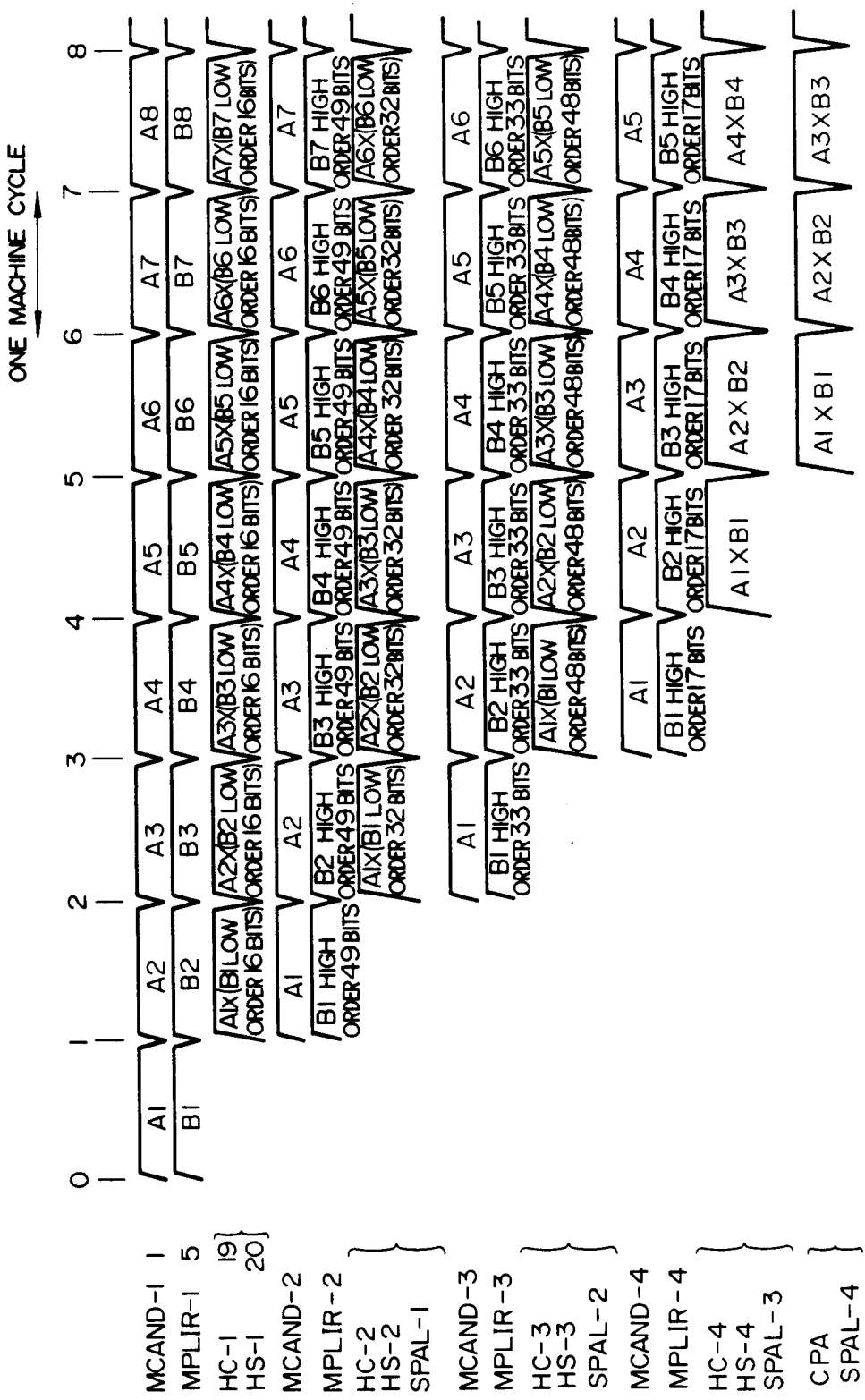
FIG. 3 is a time chart for explaining an operation of the vector multiplier.
Figure 6:
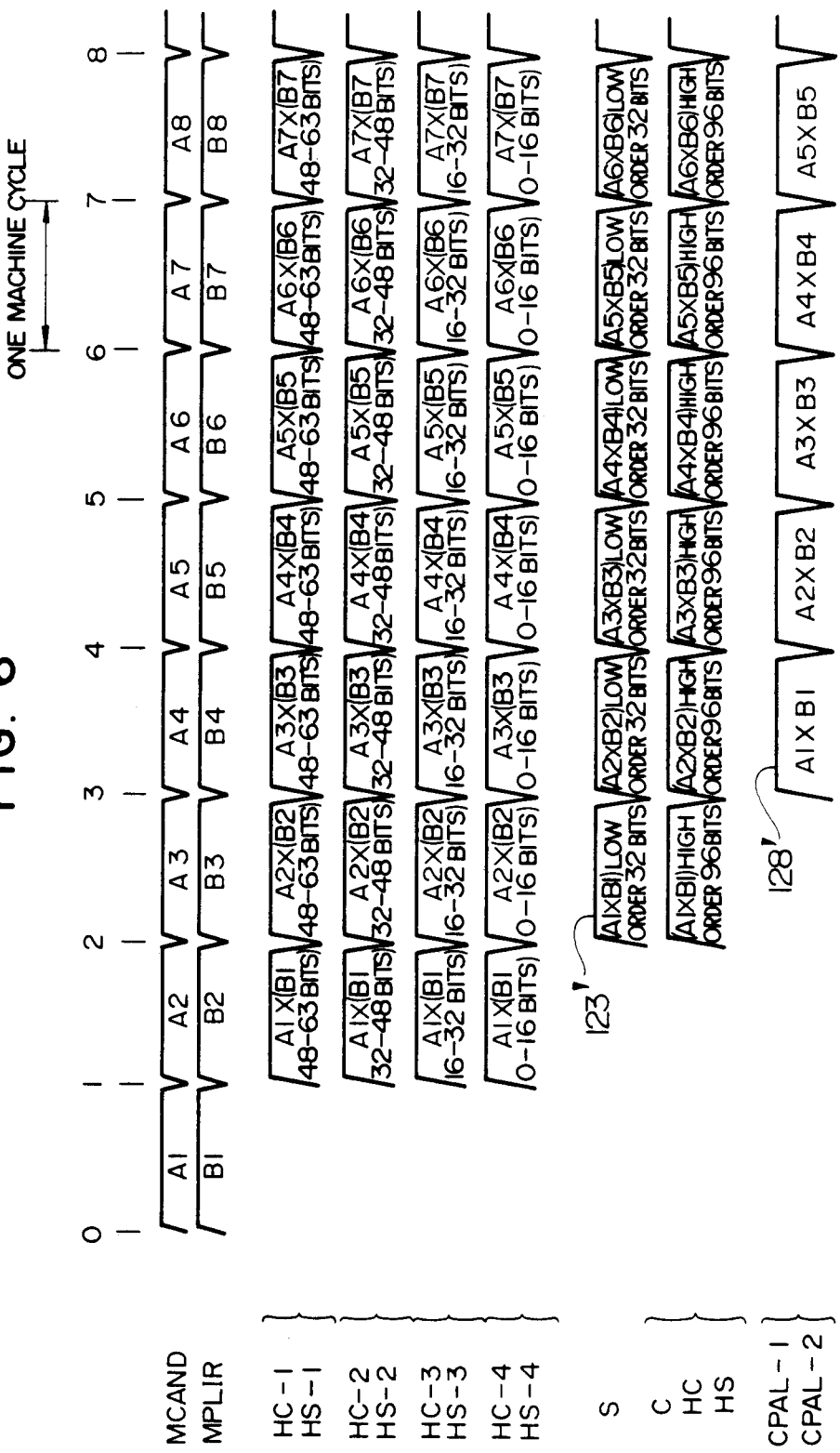
FIG. 6 shows a time chart for explaining an operation of the vector multiplier of FIG. 5.

FIG. 6 shows a time chart for explaining the operation of the vector multiplier of FIG. 5. The vector elements Ai and Bi (i=1, 2, ...) in FIG. 6 are referenced in the same manner as that in FIG. 3.

First, the A1 and B1 are set into the multiplicand register (MCAND) 101 and the multiplier register (MPLIR) 102, respectively.

Then, in the CSA trees 103 to 106, the A1 and the 48th to 63rd bits and the least significant bit "0" (17 bits) of the B1, the A1 and the 32nd to 48th bits (17 bits) of the B2, the A1 and the 16th to 32nd bits (17 bits) of the B1, the A1 and the 16th to 32nd bits (17 bits) of the B1, and the A1 and the 0-th to 16th bits (17 bits) of the B1 are multiplied to each other, and the results are set into the half-carry (HC) and half-sum (HS) registers 107 to 114. The overlappedscan among the bit groups is shown in FIG. 6 of the U.S. application Ser. No. 653,053. At the same time, the next vector elements A2 and B2 are set into the MCAND 101 and the MPLIR 102 as shown in FIG. 6, and the same operation as that carried out for the A1 and B1 in the previous machine cycle is carried out for the A2 and B2.

Figure 4:
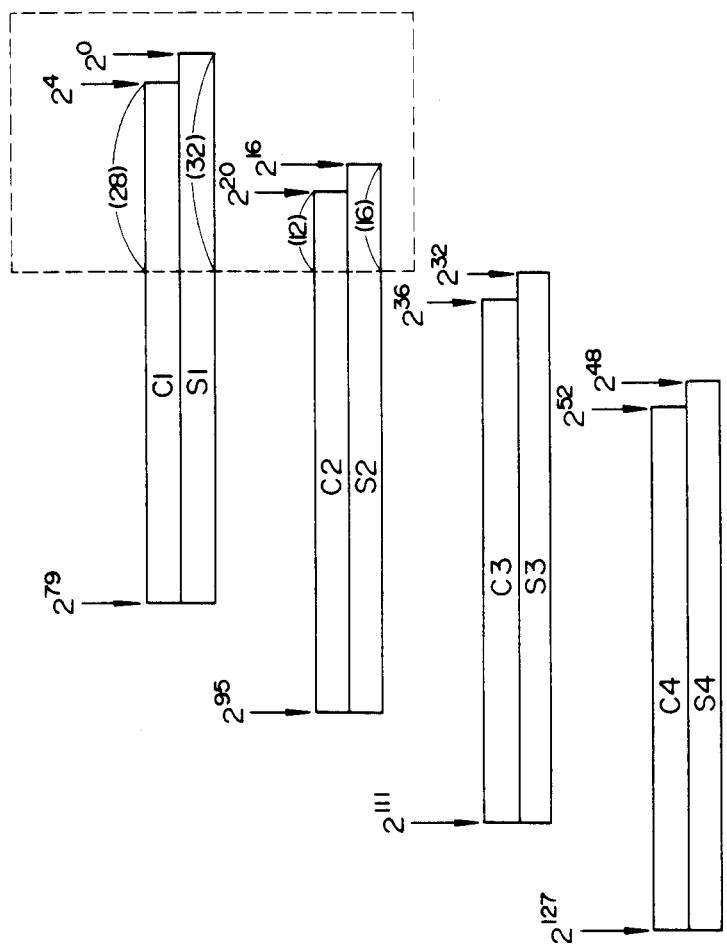
FIG. 4 shows half-carries and half-sums produced when 64×64 bits are multiplied by four 64×16 bit CSA trees.

In the carry save adders (CSA) 115 and 116 and the low order bit carry propagation adder (CPA-1) 123, the portions surrounded by the broken lines in FIG. 4 are added (123' in FIG. 6) and the resulting carry (C) and 32-bit sum (S) are set into the registers 124 and 125, respectively. The high order bits of the partial products are formed into a half-carry (HC) and a half-sum (HS) by the carry save adders (CSA) 117 to 122, and they are set into the registers 126 and 127, respectively.

Finally, the sum of the low order 32 bits stored in the register 125 is transferred to the register (CPAL-1) 129, and the two data of the registers 126 and 127 are summed in the high order bit carry propagation adder (CPA-2) 128 to which the carry from the register 124 is applied as a carry from the low order, to produce a high order 96-bit sum, which is set into the register (CPAL-2) 130 in the machine cycle 128' of FIG. 6.

Figure 1:
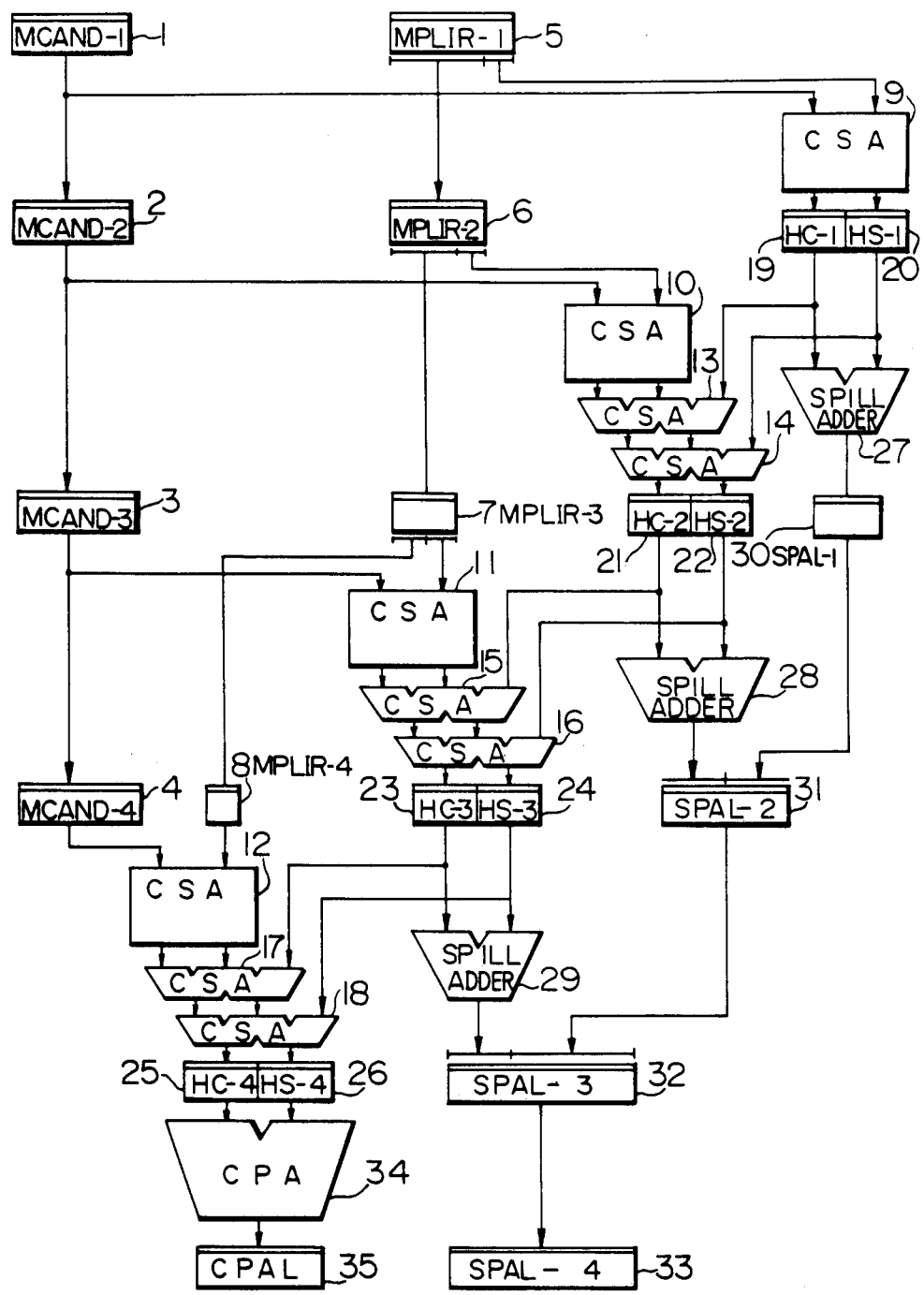
FIG. 1 shows a block diagram of a vector multiplier.

The multiplication of the first elements A1 and B1 has been described. The operation of the i-th vector elements in the vector multiplier of FIG. 1 is similar to that described above.

In accordance with the present embodiment, the multiplicand and multiplier delay registers are not necessary and a cost can be reduced. The data travel time is 3 machine cycles (see FIG. 6) compared to 5 machine cycles in the vector multiplier of FIG. 3. Accordingly, the data travel time is improved by two machine cycles.

In FIG. 5, if the number of input pins of the LSI chip for the low order carry propagation adder is too large and only the carry can be taken out but the sum cannot be taken out of an output pin, it is necessary to take out the low order sum from a plurality of another LSI chips having reduced number of input pins. Even in such a case, a merit by the reduction of the multiplicand and multiplier delay registers is larger. In the present embodiment, the 128-bit carry propagation adder is divided into the 96-bit higher carry propagation adder and the lower 32-bit lower carry propagation adder in accordance with FIG. 4. But this division is not essential to the present invention and more essentially, the carry propagation adder should be divided into two parts so that a delay time of part of carry save adders (corresponding to CSA 115 and 116 in FIG. 5) and the lower carry propagation adder (corresponding to CPA-1 123 in FIG. 5) is equal to that of a higher carry propagation adder (corresponding to CPA-2 128 in FIG. 5).

We claim:

1. A multiplier comprising:
   (a) a multiplicand register for receiving a multiplicand;
   (b) a multiplier register operable to store a plurality of bits, for receiving a multiplier;
   (c) a plurality of multiple generation means for generating a plurality of multiples of said multiplicand at the same time, each of said plurality of multiple generation means connected to said multiplicand register and a different group of said bits of said multiplier register;
   (d) carry save adder tree means for adding the outputs of said multiple generation means;
   (e) low order arithmetic operation means connected to said carry save adder tree means for carrying out carry propagation addition of low order bits of a product of said multiplicand and said multiplier; and
   (f) high order arithmetic operation means connected to said carry save adder tree means and said low order arithmetic means for carrying out carry propagation addition of higher order bits of the product of said multiplicant and said multiplier.

2. A multiplier according to claim 1 further comprising carry hold means for holding a propagation carry from said low order arithmetic operation means and supplying the held propagation carry to said high order arithmetic operation means in synchronism with the application of the outputs of said carry save adder tree means to said high order arithmetic operation means.

3. A multiplier according to claim 1, wherein said carry save adder tree means are divided into an integer number of pieces whose structure are the same, wherein said plurality of multiple generation means are connected in parallel to said multiplier register and said multiplicand register.

4. A multiplier according to claim 3 wherein said multiplier and said multiplicant area of 64-bit length, said multiplier has four carry save adder trees, the first CSA tree is connected to carry means of bits $2^4$–$2^{79}$ of bits $2^0$–$2^{127}$ and sum means of bits $2^0$–$2^{79}$, the second CSA tree is connected to carry means of bits $2^{20}$–$2^{95}$ and sum means of bits $2^{16}$–$2^{95}$, the third CSA tree is connected to carry means of bits $2^{36}$–$2^{111}$ and sum means of bits $2^{32}$–$2^{111}$, and the fourth CSA tree is connected to carry means of bits $2^{52}$–$2^{127}$ and sum means of bits $2^{48}$–$2^{127}$, and said low order arithmetic operation means carries out the arithmetic operation of bits $2^0$–$2^{31}$.

5. A method of operating a multiplication apparatus to produce a product comprising the steps of:
   (a) supplying a multiplier and a multiplicand, in parallel plurality of carry save adder trees;
   (b) multiplying preselected portions of said multiplicand by preselected portions of said multiplier to produce half carries and half sums
   (c) performing a low order bit carry propagation addition on said half carries and half sums so as to produce low order bits of the product;
   (d) producing a carry from the low order bit carry propagation addition, and
   (e) applying said carry from said low order bit carry propagation addition and other half-carries and half sums than those into added in said low order bit carry propagation addition to be carried out later in time to produce a final product.

* * * * *